J. N. WOOD.
BALING PRESS.
APPLICATION FILED MAR. 17, 1913. RENEWED OCT. 5, 1914.

1,139,092.

Patented May 11, 1915.
8 SHEETS—SHEET 1.

J. N. WOOD.
BALING PRESS.
APPLICATION FILED MAR. 17, 1913. RENEWED OCT. 5, 1914.

1,139,092.

Patented May 11, 1915.
8 SHEETS—SHEET 3.

FIG. 3.

J. N. WOOD.
BALING PRESS.
APPLICATION FILED MAR. 17, 1913. RENEWED OCT. 5, 1914.

1,139,092.

Patented May 11, 1915.
8 SHEETS—SHEET 5.

J. N. WOOD.
BALING PRESS.
APPLICATION FILED MAR. 17, 1913. RENEWED OCT. 5, 1914.

1,139,092.

Patented May 11, 1915.
8 SHEETS—SHEET 7.

J. N. WOOD.
BALING PRESS.
APPLICATION FILED MAR. 17, 1913. RENEWED OCT. 5, 1914.

1,139,092.

Patented May 11, 1915.
8 SHEETS—SHEET 8.

UNITED STATES PATENT OFFICE.

JAMES NELSON WOOD, OF BLACKSHEAR, GEORGIA, ASSIGNOR TO THE NEELY COMPRESS AND COTTON COMPANY, OF RICHMOND, VIRGINIA, A CORPORATION OF VIRGINIA.

BALING-PRESS.

1,139,092.

Specification of Letters Patent.

Patented May 11, 1915.

Application filed March 17, 1913, Serial No. 754,874. Renewed October 5, 1914. Serial No. 865,193.

*To all whom it may concern:*

Be it known that I, JAMES NELSON WOOD, citizen of the United States, residing at Blackshear, in the county of Pierce and State of Georgia, have invented certain new and useful Improvements in Baling-Presses; and I do hereby declare the following to be a full, clear, and exact description of the invention, such as will enable others skilled in the art to which it appertains to make and use the same.

My invention consists in the novel features hereinafter described reference being had to the accompanying drawings which show one embodiment of my invention selected by me for purposes of illustration and the said invention is fully disclosed in the following description and claims.

Referring to the said drawings.

The object of my present invention is to provide a baling press which while adapted specially for the baling of cotton staple, may also be used for baling other materials, which is of such comparatively light and simple construction that it may be economically erected and operated at ginning stations in the cotton producing sections and in which the cotton preferably in the form of a continuous bat may be folded back and forth, and simultaneously compressed in one operation to the density desired for economic shipment in national and international commerce, without being subjected to any further compression or recompression either at the time of forming the bale or at any time thereafter. Thus avoiding the necessity after forming the cotton into a bale, of giving it a final compression at the point where the bale is made before shipment, and also avoiding the necessity of subsequent recompression of the bale at the seaboard, by the massive and expensive recompressing apparatus which are maintained for that purpose.

In the embodiment of my invention selected by me for the purpose of illustrating the same, the cotton in the form of a bat is folded and simultaneously compressed to the desired density upon a bottom platen or block held in place preferably by a hydraulic cylinder and piston arranged to recede when the pressure against it exceeds a predetermined amount, the folding and compressing of the cotton being effected by two series of separate folding and compressing bars and appropriate mechanism for actuating the same, said bars being adapted to engage different portions of the upper face of the bale and extending across the bale, the sum of the area of the bale engaging faces of said bars being nearly equal to the area of the upper face of the bale, the construction being such that the said bars of one series are successively raised from engagement with the bale and are successively replaced by a bar of the other series to permit the successive laps of the bale to be folded upon the same, sufficient pressure being applied to said bars after they engage the bale, and in a direction toward the same to insure the actual compression of the bale to the required density.

It is to be noted that in my improved press all relative reciprocation or oscillation between the bale and the forming and compressing devices is avoided together with the consequent frictional travel of parts across the top of the bale during its formation, and instead the pressure is applied cleanly and directly against the top of the bale. It is also to be noted that the top of the bale is never entirely released during its formation, a portion or strip only being uncovered at a time while the remaining portions of the bale are so firmly held under compression that the momentary release of such a small portion is not attended by any material expansion of even the exposed portion of the bale, and the part so released is immediately placed under renewed compression with an additional thickness or layer of the bat upon the same.

In the embodiment of my invention herein illustrated, 1 represents a base or supporting frame constructed preferably of channel beams, and supported on heavy timbers 2, upon a suitable foundation. To the supporting frame are secured a plurality of vertical columns 3, preferably bolted thereto and carrying at their upper ends the frame of the bale folding and compressing devices, said frame comprising in this instance the side frames 4, 4 connected by transverse shouldered rods 5, 5 and 6, 6 and nuts, thus forming a strong and rigid frame with a minimum of weight.

The frame 1 is provided with transverse beams to which is secured a hydraulic cylinder 70 having a piston 71 therein carrying a head or plunger plate 72 for engaging the vertically movable bottom or platen 60 upon which the bale is compressed. The piston is provided with means for preventing it from turning in the cylinder and the platen and plunger head are provided with interlocking devices for preventing any relative turning between them. In this instance the plunger head is provided with vertical guide rods 73 which engage guiding apertures in a part connected with the cylinder, and the plunger is provided at opposite edges with upwardly projecting ribs 74, which engage corresponding recesses in the bottom of the platen 60. The cylinder is supplied with pressure fluid by a suitable pipe 75 closed by a valve 76, and is also provided with an exhaust pipe 77 provided with a valve 78, and an adjustable pressure operated relief valve 79, which may be in a separate branch pipe as shown and is set to open when the fluid in the cylinder reaches a predetermined point, to allow the pressure fluid to be discharged until the predetermined pressure is again reached.

Figure 15:
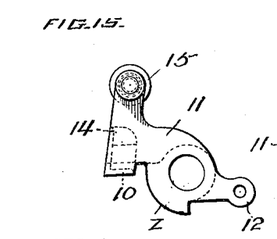
Figure 16:
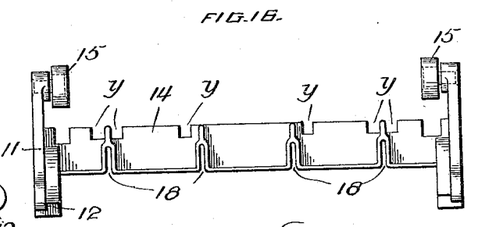

Upon each of the cross bars 6, 6 are mounted pivotally a series of compressing bars, and as the bars of each series are alike respectively in construction, a description of one series will apply to both. Each series of compressing bars may comprise any desired number. I have shown four in each series 10, 20, 30, 40, disposed longitudinally of the bale, that is to say parallel to the lines of fold of the bat, and disposed at different positions over the top of the bale, with slight spaces between, the combined areas of the bale engaging faces of the said bars being nearly equal to the area of the top of the bale. The bar 10 which is located nearest to the pivotal supporting bar 6, is shown in detail Figs. 15 and 16, and is provided with a pair of arms or webs 11, located preferably adjacent to the ends of the bar having pivotal apertures therein to engage the shaft 6, and provided in this instance with an outwardly extending lever arm 12 on the other side of the pivotal connection to which a counter balance spring 13 is connected. In order to make the bar 10 light and yet sufficiently rigid, it is preferably provided with a vertically disposed web 14. Each of the arms 11 is provided with a friction roll 15 to engage suitable cams 16, 16 on a cam shaft 7 mounted in bearings in the side frames 4 one of said cams being shown in detail in full lines in Fig 6.

Figure 13:
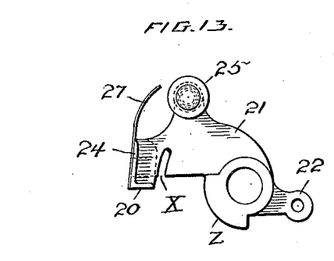
Figure 14:
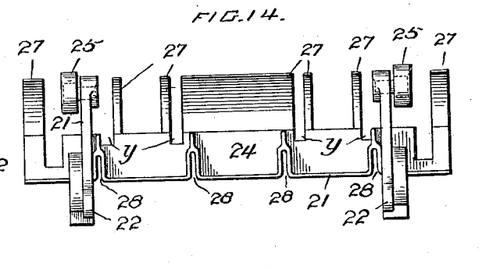

The bar 20, illustrated in detail, Figs. 13 and 14, is formed similarly to bar 10, and has a vertically disposed web 24 and arms 21, set nearer the center of the length of the bar and each provided with an extension 22 to engage a spring 23, and with a roll 25 to engage a cam 26 on shaft 7. The bar 20 is also provided with upwardly extending guards or fenders 27 so placed as to avoid striking other parts of the device, for the purpose of preventing the bat from being caught and carried upward by the bar in its rising movements.

Figure 11:
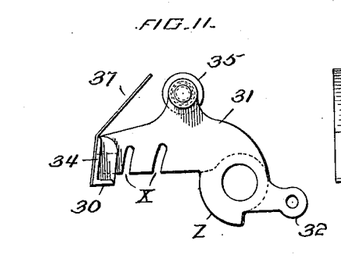
Figs. 11 and 12, 13 and 14, 15 and 16 are similar views respectively of the other bars of the series.
Figure 12:
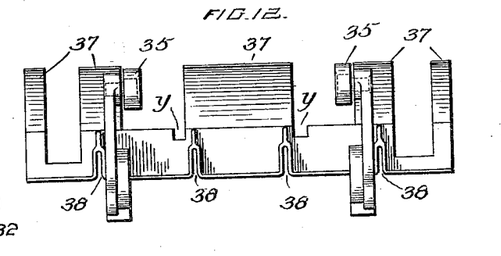

The bar 30 (shown in detail Figs. 11 and 12) is provided with the web 34, arms 31, of greater length than arms 21, and each having the rear extension 32 to engage spring 33, and friction roll 35 to engage a cam 36 on shaft 7, said bar 30 being also provided with guards or fenders 37.

Figure 9:
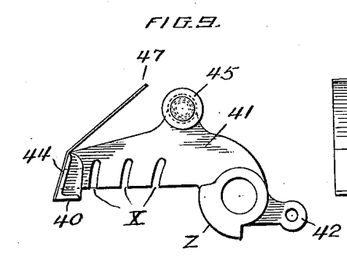
Figs. 9 and 10 are detail end view and rear elevation respectively of one of the folding and compressing bars of one series and the parts connected therewith.
Figure 10:
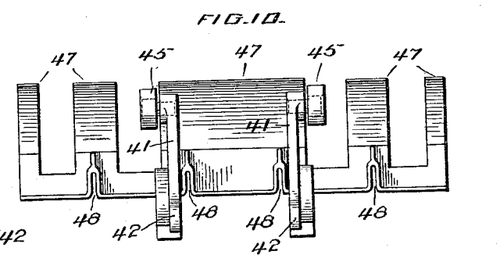

The bar 40 (shown in detail Figs. 9 and 10) has the longest arms 41, placed nearer the center of the length of the bar and each provided with the rear extension 42 to engage a spring 43, and a roll 45 to engage a cam 46 on the shaft 7, said bar having also the web 44 and fenders or guards 47.

In order that the bars may have the required range of movement without conflicting with the stiffening webs, the arms are notched as shown at $x$ where necessary, the arms 21 each having one such notch arms 31 two and arms 41 three, and in order not to weaken the arms the webs are correspondingly notched as at $y$ the web 34 having two such notches, the web 24 four and the web 14 six.

Figure 5:
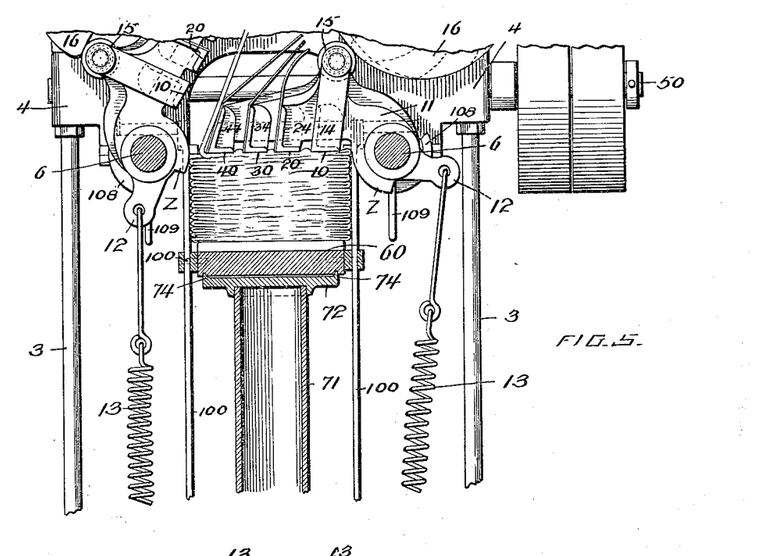
Fig. 5 is a detail sectional view of the upper portion of the press showing the bale partially folded and compressed to the desired density.

It will be seen that the arms 11, 21, 31, 41 lie comparatively close to each other and each is provided with a portion $z$ which act conjointly at all times to form a sort of chamber to confine the upper end of the bale as it is being formed and prevent the bat from working laterally as it is folded (see particularly Fig. 5). As the faces $z$ are concentric with the pivotal axis of the arms the shape of this bale confining chamber will be the same whether the arms are in raised or lowered positions.

Figure 6:
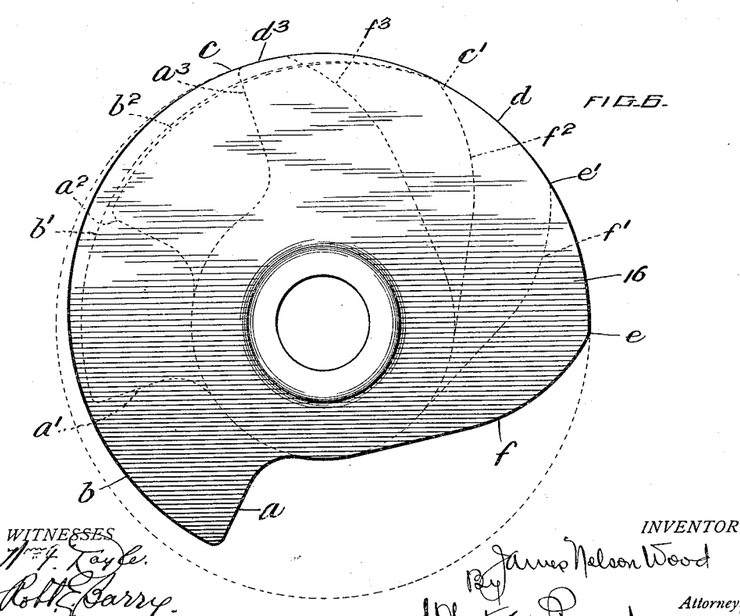
Fig. 6 is a detail view of one of the compression cams employed in the embodiment of the invention herein shown, for operating one of the folding and compressing bars, the other cams of the same series being illustrated in dotted lines.
Figure 7:
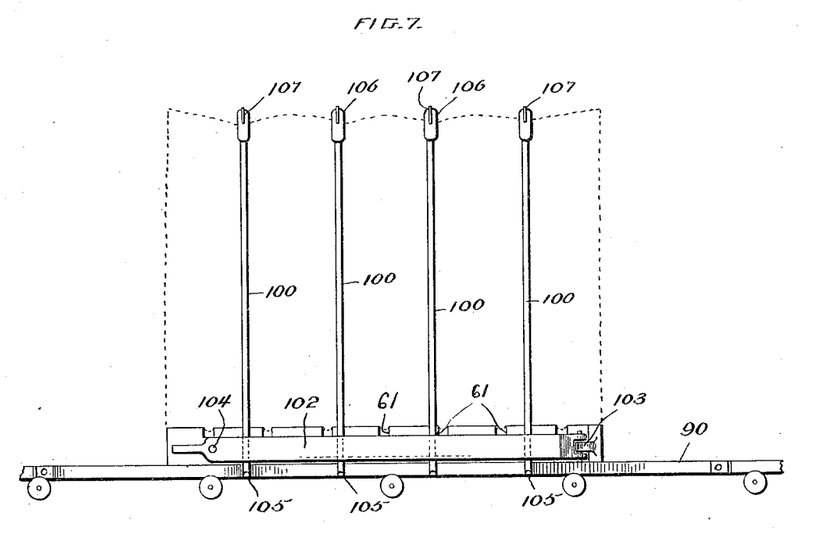
Fig. 7 is a side elevation of the removable bottom of the press with one form of bale securing means applied thereto, the finished bale being indicated in dotted lines, and a portion of the turn table being shown in full lines.
Figure 8:
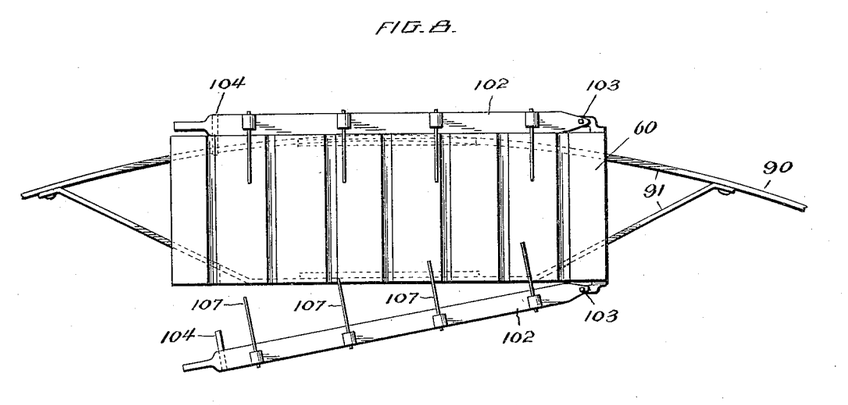
Fig. 8 is a plan view of the parts shown in Fig. 7, the bale retaining devices at one side being swung outward as in releasing the bale.

The cams 16, 26, 36 and 46 are so placed on the shaft 7 that they will actuate the bars 10, 20, 30, 40 successively, and the corresponding cams on the other cam 7, are similarly placed. The two cam shafts are also timed with respect to each other so as to secure the desired alternation of the compressing bars of the two series, the bar 40 of one series descends as the bar 10 of the other series rises, then the bar 30 of the first series descends as the bar 20 of the other series rises, then the bar 20 of the first series descends as the bar 30 of the other series rises then the bar 10 of the first series descends as the bar 40 of the other series rises after which the operation is reversed. Each of the cams is provided with a quick acting grade adapted to swing the bar operated thereby, rapidly from raised position down on to the top surface of the bale, and a slow grade for forcing the bar with great pressure toward the bale to impart the desired density thereto after the bar has been lowered upon the bale. In Fig. 6 I have shown in full lines one of the cams for actuating one of the bars 10, said cam being provided with the quick acting grade $a$ for engaging the roll 15 and depressing the bar 10 upon the bale. The roll then passes to the compressing grade $b$, which extends to the point $c$ and merges into a concentric rest $d$ extending to point, the grade $b$ and rest $d$ being of sufficient length to hold the bar 10 down on the bale until all the other bars of the series have been depressed and raised, when a rising grade $f$ permits the bar 10 to rise under the action of its counter balance spring. Obviously the bar 20 will not be held down for such a long period and the cam 26 therefor will be differently shaped as indicated in dotted lines in Fig. 6 which illustrates in dotted lines the form of the other cams 26, 36 and 46, and their relative positions on the cam shaft with respect to each other and to cam 16. $a'$ represents the depressing grade, $b'$ the compressing grade, extending to $c'$ and merging into a concentric rest coincident with a portion of the rest $d$ of the cam 16, extending to the point indicated at $e'$, and followed by a rising grade $f'$. The shape of the cam 36 for the bar 30 is also indicated in dotted lines in Fig. 6 and is provided with the depressing grade $a^2$ the compressing grade $b^2$ which extends preferably to the point indicated at $c'$, and is followed directly by the rising grade $f^2$. The shape of cam 46 for the bar 40 is also shown in dotted lines in Fig. 6, this cam being provided with a depressing grade $a^3$, a rest $d^3$ and a rising grade $f^3$. The bar 40 of each series is preferably not designed to exert a heavy pressure on the cotton, but acts merely as a folder, and retires almost immediately to be replaced by the bar 10 of the other series, which is acted on by the long compressing grade $b$ of cam 16 to compress this portion of the bale. It will also be noted that the compressing action of bars 20 and 30 is made more efficient with a minimum of power by carrying the compressing grades $b'$ and $b^2$ of its cams to the point $c'$ so that the actual compression by bar 20 is continually increased while the bars 30 and 40 are depressed and the latter raised partially, and likewise the compression by bar 30 is continually increased while the bar 40 is depressed and partially raised. Hence the bale is subjected to a very high degree of compression which is effected by a minimum expenditure of power.

Motion is imparted to the cam shafts 7 by any desired means. In the drawings I have shown each shaft 7 provided with a worm wheel 8, engaged by a worm 9 on a driving shaft 50 provided with fast and loose pulleys or other driving means.

The cotton bat is fed in to the press by any suitable means. I prefer to provide the top framing with a hopper 80, in which are located feed rolls 81, 81 carried by shafts 82, 82. These rolls are connected by gearing and driven from one of the cam shafts. In this instance the roll shafts are provided with intermeshing pinions 83, 83 and one of said shafts is also provided with a gear 84 meshing with a gear 85 on one of the cam shafts 7.

I prefer to provide means for retaining the bale under final compression when it is finished, and also to remove it from the press for tying so that the press can operate practically continually. I prefer therefore, to provide a rotating frame or turn table 90 suitably operated either by hand or by power and provided with two or more supporting frames 91 for holding the bottom platens 60, the turn table being partially shown in the drawings. The supporting frames are of necessity open to permit the plunger head to rise therethrough.

Figure 1:
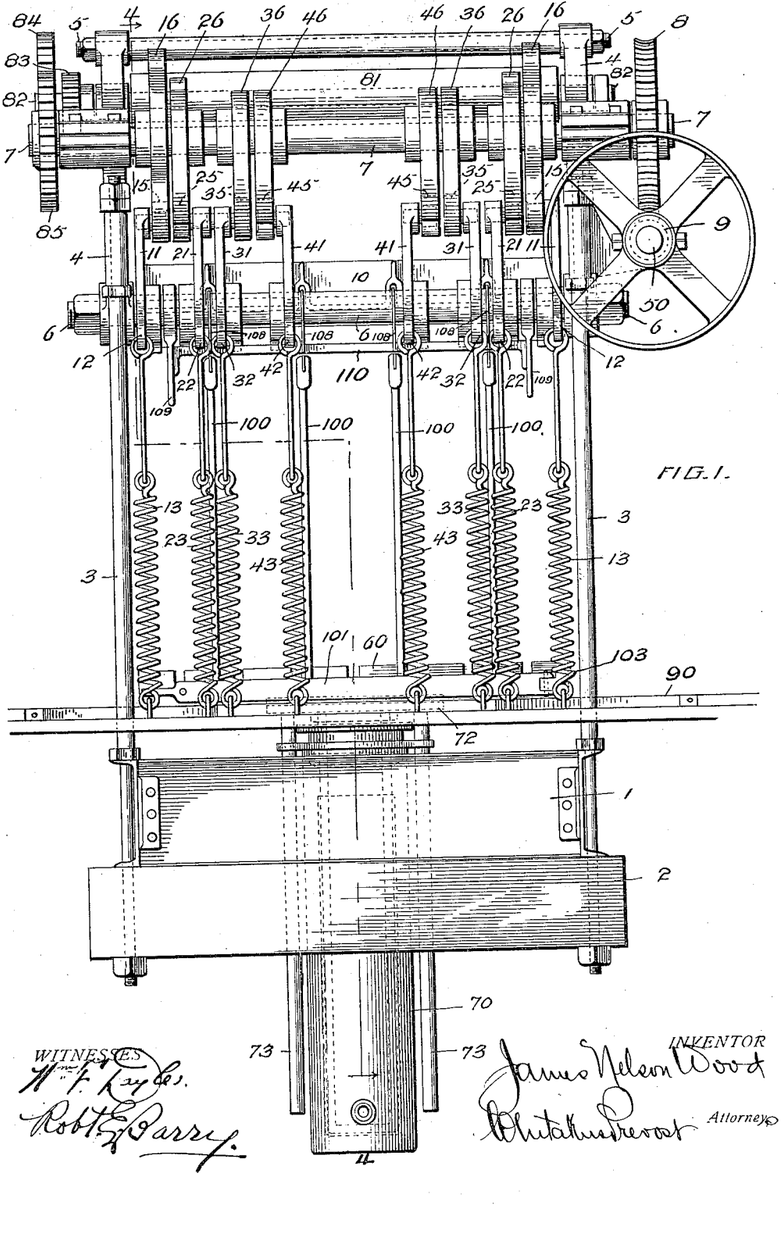
Figure 1 represents an end elevation of a cotton baling press, the same being an embodiment of my invention selected by me for the purpose of illustrating the same.
Figure 2:
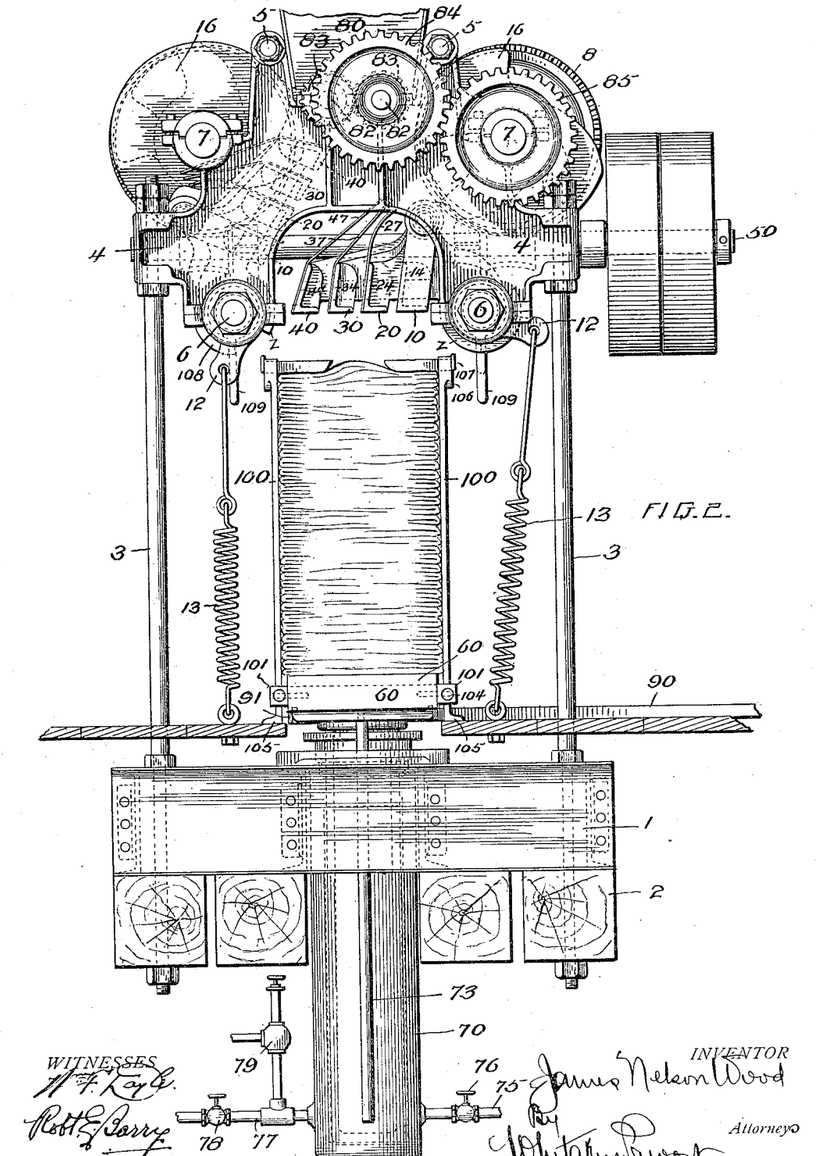
Fig. 2 is a side elevation of the press the baling floor being shown in section, as well as portions of the turn table for removing the finished bale for subsequent wrapping and tying.
Figure 3:
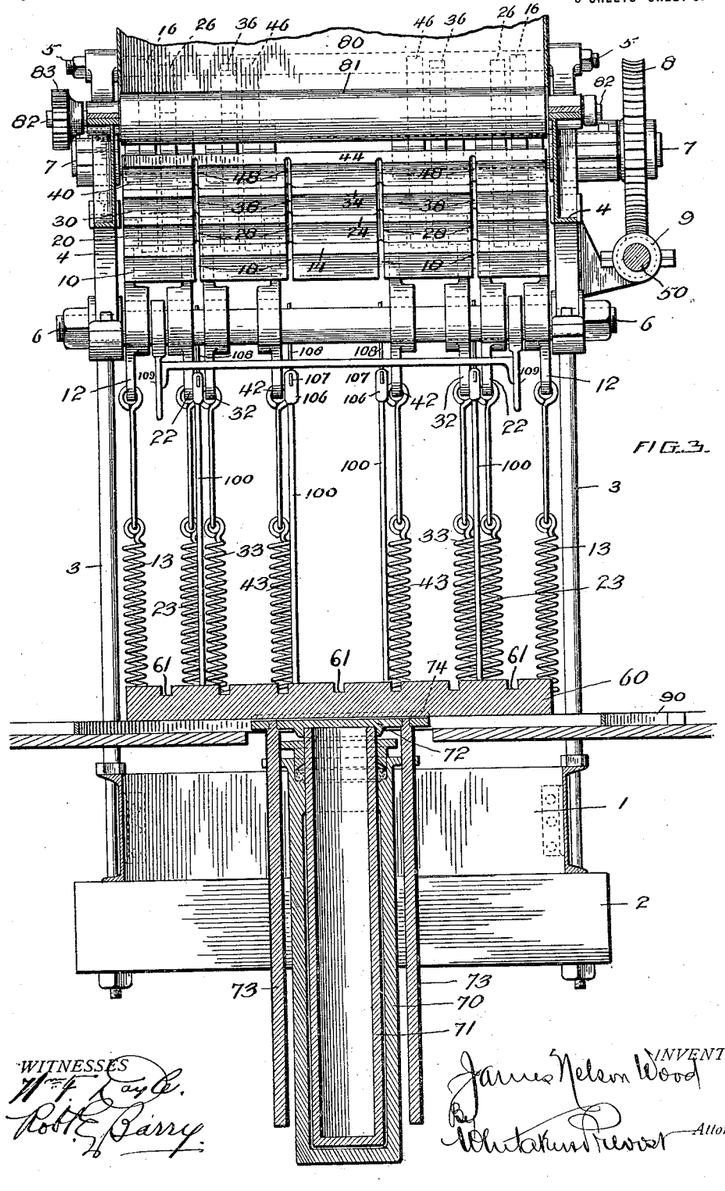
Fig. 3 is a central vertical transverse section of the press, taken longitudinally of the bale.
Figure 4:
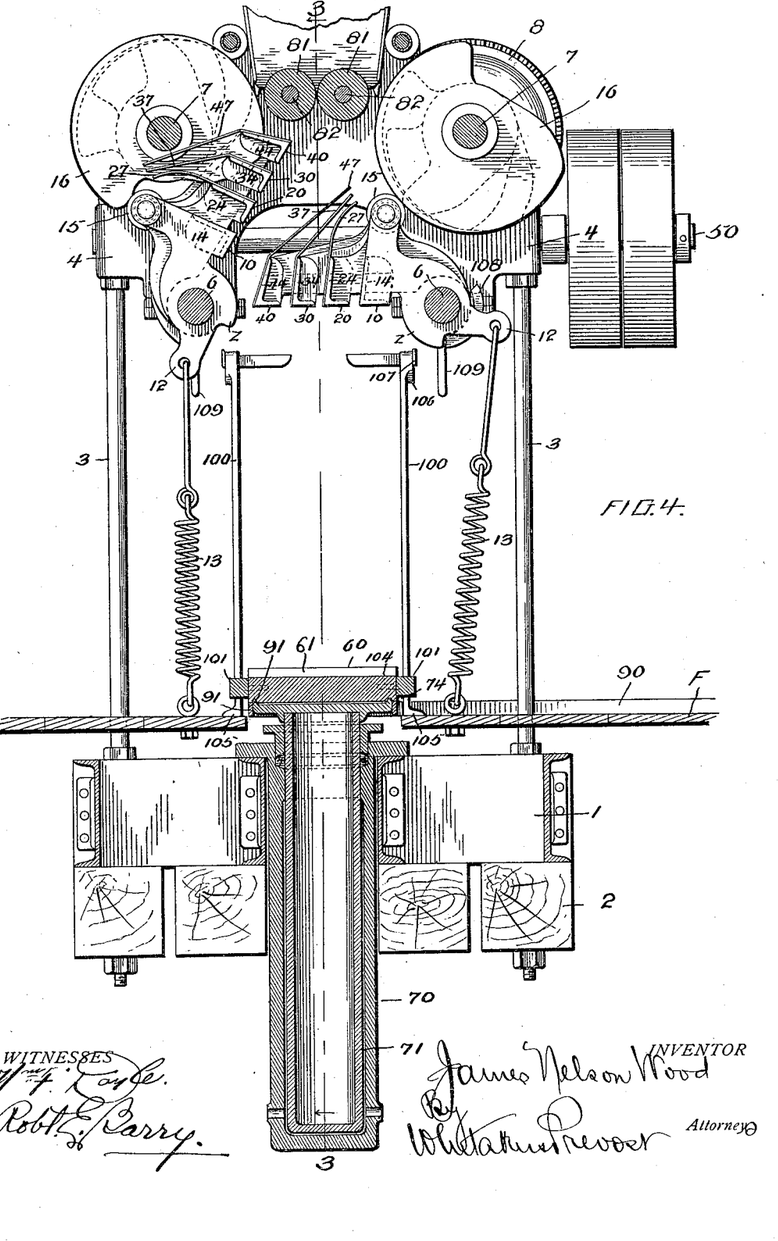
Fig. 4 is a section on line 4—4 of Fig. 1 taken transversely of the bale.

In Figs. 1 to 8, I have shown one form of bale retaining devices which comprise a plurality of upright bars 100 extending loosely or frictionally through guides 101 secured to the platen 60, said guides being preferably carried by or formed in bars 102, extending along opposite sides of the platen 60, and hinged thereto as at 103 at one end, said bars each carrying a stud 104 at their opposite ends to engage an aperture in the platen when in operative position, or other means may be provided for securing the free ends of said bars to the platen. The bars 100 are provided with means for limiting their movement with respect to the guides, in this instance projections 105 being provided at their lower ends, and enlarged heads 106 at their upper ends, said heads having horizontal slots therein to receive movable retaining blades 107. When the platen 60 is moved into baling position as shown in Fig. 4, the lower ends of the rods 100 will be in their lowest positions and may rest on the baling floor, F or other support. As the plunger head moves upward and lifts the platen the bars 100 may slide freely through the guides and remain for a time resting on the supporting surface, or if there is sufficient friction with said guides they will rise until they engage portions of the press above them after which the platen will move up on said rods. In any event the guides will engage the enlarged heads of the rods and raise them to the desired height when the retaining blades 107 will be drawn outward above the cross bars 6 to hold said rods in their raised position while the bale is formed. When a bale of the required size has been formed the retaining blades are forced in by the attendant over the top of the bale, through vertical recesses in the compressing bars 18, 28, 38 and 48 provided therein for the purpose as shown in the drawings particularly Figs. 9 to 16. In order to assist in forcing these retaining blades into position I prefer to provide cams 108 on cross shafts 6 for the purpose of having their peripheries so constructed as to drive the retaining blades home, and having operating handles 109. I may also connect the cams on each cross shaft 6 for joint operation by means of a rod or bar 110 as indicated in Fig. 1 or other means, if desired but this is not essential. These retaining blades are shoved into position while the bale is under compression by the compressing bars and as soon as they are in place the bale may be lowered on to the turn table by the piston and the turn table rotated to remove the bale from the press, and bring another platen into baling position. As soon as the finished bale is withdrawn from the press it can be secured by bale bands, in the usual manner the platen being provided with bale band recesses 61 to facilitate this operation. After the bale is secured the hinged bars 102 can be swung laterally to facilitate the removal of the bale from the platen.

Figure 17:
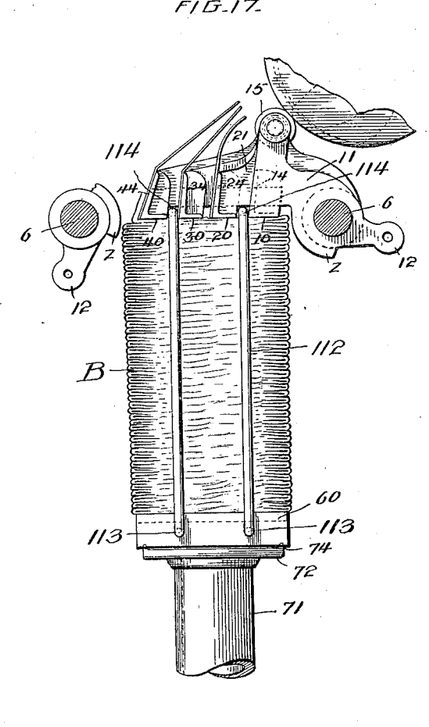
Fig. 17 is a detail view showing portions of the press, a finished bale therein and a modified means for retaining the bale under compression when removed from the press.
Figure 18:
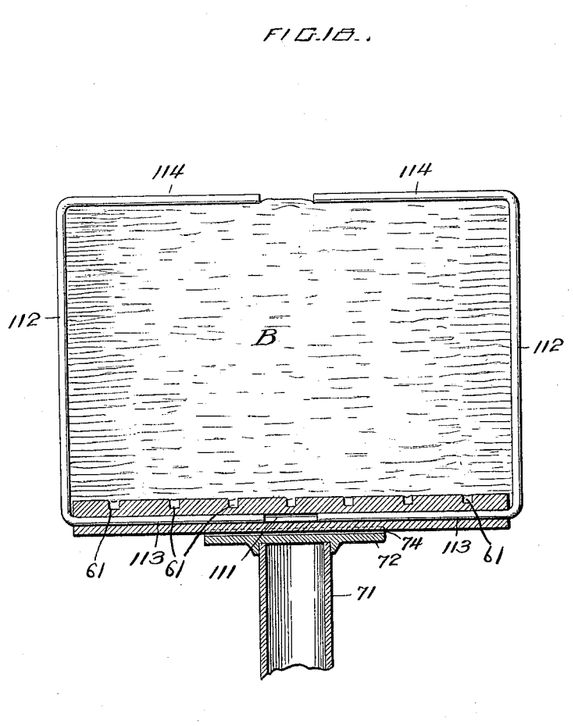
Fig. 18 is a sectional view of the parts shown in Fig. 17 taken longitudinally of the bale, but omitting the folding and compressing bars.

In Figs. 17 and 18 I have shown another means for securing the bale under compression which is my preferred construction. In this case the platen is provided with suitable recesses 111 extending longitudinally thereof, that is to say parallel to the lines of fold of the bat, to receive the lower ends of U-shaped retaining devices 112 provided with arms 113 and 114 the former being adapted to enter said recesses and the latter being adapted to extend over the top of the bale and to be inserted in the channels formed between the compressing bars 10, 20, 30, 40. I may employ two or more of these retaining devices at each end of the bale, as preferred. By confining the bale by longitudinally disposed devices, the recesses 18, 28, 38 and 48 in the compressing bars may be omitted. These retaining devices are also more easily inserted as the ends of the bales are more readily accessible to the attendants, and it is not necessary for them to go between the frames of the press to place them. The retaining bars can also be applied closer to the top layer of the compressed bale and the bale will have very little opportunity to expand on being released by the compressing bars, and the construction is one of great simplicity and cheapness.

While I have shown the compressing or plunger bars as operated by cams in one direction and by springs in the opposite direction I do not wish to be limited to this method of operating the said plunger bars, as they may be operated in either or both directions by other means.

In operating the press one of the platens 60 is brought into position above the hydraulic plungers, and the valve 76 is opened to admit pressure fluid which need have only sufficient pressure to lift the piston and the platen, so as to carry the latter up to the horizontal plane of the compressing or plunger bars in their lowered positions when the valve 76 is closed. The cotton bat is fed into the press by the rollers 81 and will be laid back and forth on the platen 60 in laminations, the plunger bars by their alternate and successive action uncovering a portion only of the face of the bale under formation long enough to permit the bat to fall thereon when the plunger bar of the opposite series presses such portion into place and compresses it against the layers beneath in the manner previously described. The compressing action of the plunger bars is resisted by the piston and the fluid in the cylinder during the formation of the bale and whenever the pressure on said fluid exceeds that for which the relief valve 79 is set the said valve will open and discharge a portion of the fluid, thus permitting the piston and platen to gradually recede. When the bale has been formed to the required size it is secured against expansion by the devices illustrated in Figs. 1 to 8, or by the preferred form of retaining means illustrated in Figs. 17 and 18. The valve 78 is then opened to discharge enough of the remaining fluid to permit the platen and finished bale to descend upon the turn table for removal from the press. The wrapping for the bale or such portions of it as are desired, may be laid on the platen of the press before the bale is formed and the bale is covered and tied in any desired way, while another bale is being formed in the press.

It will be seen that the whole construction of the press is extremely simple and light for a structure capable of exerting such a high pressure. The bale is compressed as it is formed, to the desired density for shipment and is not subjected to any subsequent compression either at the place where it is made or elsewhere.

It will be noted that the bale supporting means and the compressing or plunger bars are so supported as to be held from relative movement laterally at all times while the plunger bars are in contact with the compression face of the bale. As a result there is no friction between the top of the bale and the compressing means, as is the case where rollers are used for compression and which has a tendency to push or crowd the cotton laterally and form waves. On the contrary in my press the compressing action is directly and positively applied substantially perpendicularly to and toward the compression face of the bale.

What I claim and desire to secure by Letters Patent is:—

1. In a baling press, the combination with means for supporting the bale during its formation, of means for positively compressing and maintaining compression of the bale throughout substantially the entire area of the compression face of the bale, and for exposing a portion of the said face at a time to permit the addition of material, said compressing means having a fixed relation with the bale while in contact therewith, supporting means for the compressing means, said supporting means and the bale supporting means being held from relative movement in all directions parallel with the compression face of the bale.

2. In a baling press, the combination with means for supporting the bale during its formation, of means for positively compressing and maintaining compression of the bale throughout substantially the entire area of the compression face of the bale, and for exposing a portion of the said face successively across the compressing surface to permit the addition of a complete layer of material, said compressing means having a fixed relation with the bale while in contact therewith, supporting means for the compressing means, said supporting means and the bale supporting means being held from relative movement in all directions parallel with the compression face of the bale.

3. In a baling press, the combination with a plurality of independently actuated compressing devices having bale engaging faces whose combined areas are substantially equal to the area of the compression face of the bale and means for positively and independently forcing said compressing devices into engagement with the bale, and for raising them singly to permit the insertion of a layer of material while maintaining the bale under the pressure of the others.

4. In a baling press, the combination with bale forming and compressing devices having faces for engaging different portions of the bale, the combined areas of said bale engaging faces being substantially co-extensive with the engaged face of the bale, independent actuating means for positively forcing each of said devices into contact with the bale and holding it in position to retain the compression thereof, and for raising said devices successively to permit the insertion of a layer of material upon the exposed surface of the bale while maintaining the compression of the unexposed portions thereof.

5. In a baling press, the combination with receding pressure means for supporting a bale during its formation, of a plurality of unconnected compressing devices movable independently into and out of engagement with different portions of the engaged face of the bale, the combined areas of the said portions of the face of the bale engaged by said devices being substantially co-extensive with the face of the bale, said devices being held against lateral movement with respect to the bale when in engagement therewith, independent actuating means for positively forcing said devices into and holding them in engagement with the bale, and for raising them singly to permit of the application of material upon the exposed surface while maintaining the compression upon the unexposed portions.

6. In a baling press, the combination with receding pressure means for supporting a bale during its formation, of a plurality of unconnected compressing devices movable independently of each other into and out of engagement with different portions of the engaged face of the bale, the combined areas of the said portions of the face of the bale engaged by said devices being substantially co-extensive with the face of the bale, said devices being held against lateral movement with respect to the bale when in engagement therewith, and independent actuating means for positively moving each of said devices positively and independently into compressing contact with the bale and positively holding it in fixed contact therewith for a predetermined period.

7. In a baling press, the combination with receding pressure means for supporting a bale during its formation, of a plurality of unconnected compressing devices movable into and out of engagement with different portions of the engaged face of the bale, the combined areas of the said portions of the face of the bale engaged by said devices being substantially co-extensive with the face of the bale, said devices being held against lateral movement with respect to the bale when in engagement therewith, and actuating mechanism for said devices provided with means for positively and quickly moving each of said devices independently into contact with the bale, and thereafter forcing it gradually and with increased leverage in a direction substantially perpendicular to and toward the bale.

8. In a baling press the combination with means for supporting a bale during its formation, of a plurality of independent plungers for engaging different portions of the bale, supporting means for said plungers, held against lateral movement with respect to the bale, and a plurality of cams for moving said plungers independently of each other into engagement with the compression face of the bale.

9. In a baling press the combination with means for supporting a bale during its formation, of a plurality of independent plungers for engaging different portions of the bale, supporting means for the plungers, held against lateral movement with respect to the bale, and a plurality of cams for moving said plungers independently of each other into engagement with the compression face of the bale, said cams being each provided with means for holding the plunger actuated thereby in contact with the bale for a predetermined period.

10. In a baling press the combination with means for supporting a bale during its formation, of a plurality of independent plungers for engaging different portions of the bale, supporting means for the plungers held against lateral movement with respect to the bale, and a plurality of cams for moving said plungers independently of each other into engagement with the compression face of the bale, said cams being each provided with means for holding the plunger actuated thereby in contact with the bale for a predetermined period, and mechanism for driving said cams so as to secure the operation of the said plungers in a definite order.

11. In a baling press, the combination with receding pressure means for supporting a bale during its formation, of a plurality of compressing devices movable into and out of engagement with different portions of the engaged face of the bale, the combined areas of the said portions of the face of the bale engaged by said devices being substantially co-extensive with the face of the bale, said devices being held against lateral movement with respect to the bale when in engagement therewith, means for positively moving said devices successively into contact with the bale, and thereafter imparting a gradual compression on the bale, and for positively holding each of said devices in compressing contact with the bale for a predetermined period.

12. In a baling press, the combination with receding pressure means for supporting a bale during its formation, of a plurality of compressing devices movable into and out of engagement with different portions of the engaged face of the bale, the combined areas of the said portions of the face of the bale engaged by said devices being substantially co-extensive with the face of the bale, said devices being held against lateral movement with respect to the bale when in engagement therewith, means for moving said compressing devices away from the bale, and cams for actuating said devices successively in a direction toward the bale, said cams being provided with grades for quickly moving the said devices into contact with the bale, and compressing grades for forcing them positively in a direction substantially perpendicular to and toward the bale.

13. In a baling press, the combination with receding pressure means for supporting a bale during its formation, of a plurality of compressing devices movable into and out of engagement with different portions of the engaged face of the bale, the combined areas of the said portions of the face of the bale engaged by said devices being substantially co-extensive with the face of the bale, said devices being held against lateral movement with respect to the bale when in engagement therewith, means for moving said compressing devices away from the bale, and cams for actuating said devices successively in a direction toward the bale, said cams being provided with grades for quickly moving the said devices into contact with the bale, and compressing grades for forcing them positively in a direction substantially perpendicular to and toward the bale, and with rests for holding the bale under compression for predetermined periods.

14. In a baling press, the combination with two series of unconnected bale forming and compressing devices, the devices of each series having bale engaging surfaces substantially co-extensive with the engaged face of the bale, of means for positively forcing and holding the devices of each series in contact with the bale, said means being adapted to permit each of said devices of each series to be independently raised and replaced by a device of the other series, to permit the insertion of the material on the exposed portion of the bale while maintaining the compression on the other portions thereof.

15. In a baling press, the combination with two series of movable compressing bars, provided with bale engaging faces and movable into and out of contact with the bale, each bar of each series being adapted to engage substantially the same portion of the surface of the bale as a bar of the other series, and means for moving the bars of different series alternately and successively into engagement with the bale, and for holding a plurality of said bars at all times in engagement with the bale to retain the compression thereof.

16. In a baling press, the combination with two series of pivotally mounted bale forming and compressing bars, the combined areas of the bale engaging faces of the bars of each series being substantially co-extensive with the compression face of the bale, and means for forcing said bars of each series successively and alternately into compressing engagement with the compressing face of the bale, and maintaining a plurality of said bars in compressing position at all times during the operation of the press.

17. In a baling press, the combination with two series of pivotally mounted bale forming and compressing bars, the combined areas of the bale engaging faces of the bars of each series being substantially co-extensive with the compression face of the bale, and means for forcing said bars of each series successively and alternately into compressing engagement with the compressing face of the bale, and for maintaining them in such compressing engagement for a predetermined period, and means for raising said bars singly to admit material, while maintaining the compression on the remaining engaged portions of the bale.

18. In a baling press, the combination with a vertically movable bale supporting platen, a pressure actuated piston and cylinder therefor, means for holding the piston and cylinder from relative rotation, said platen and the platen engaging part connected with the piston having interlocking devices for preventing horizontal relative movement, of bale forming and compressing devices comprising two series of swinging arms, plunger bars carried thereby adapted to extend longitudinally of the bale when in contact therewith, and having their combined areas substantially equal to the compression face of the bale, pivotal supports for said arms located at opposite sides of the bale, rollers carried by said arms, rotary cams engaging said rollers and provided with grades for actuating said bars toward, and permitting them to recede from the bale, and devices for maintaining the said rolls in engagement with said cams.

19. In a baling press the combination with means for supporting the bale during its formation, of a plurality of plungers whose combined areas are substantially equal to that of the compression face of the bale, said plungers being movable independently of each other toward and from the bale, means for positively forcing said plungers independently into and holding them in contact with the bale, and for withdrawing them singly while retaining the compression of the bale by the others, and means for feeding the material to be baled to the portion of the compression surface of the bale exposed by the withdrawal of a plunger.

20. In a baling press the combination with means for supporting the bale during its formation, of a plurality of plungers whose combined areas are substantially equal to that of the compression face of the bale, said plungers being movable independently of each other toward and from the bale, means for positively forcing said plungers independently into and holding them in contact with the bale, and for withdrawing them singly and successively while retaining the bale under compression by the others, and means for feeding the material to be baled successively to the portions of the compression surface exposed by the withdrawal of the plungers, to lay the material in laminated folds.

21. In a baling press the combination with means for supporting the bale during its formation, of a plurality of plungers whose combined areas are substantially equal to that of the compression face of the bale, said plungers being unconnected and movable independently of each other toward and from the bale, means for positively forcing said plungers independently into and holding them in contact with the bale, and for withdrawing them singly while retaining the bale under compression by the others, means for positively feeding the material in a sheet toward the bale, and means for directing portions of the sheet upon the portions of the compression surface exposed by the withdrawal of the plungers therefrom.

22. In a baling press the combination with means for supporting the bale during its formation, of a plurality of plungers whose combined areas are substantially equal to that of the compression face of the bale, means for positively forcing said plungers into and holding them in contact with the bale, and for withdrawing them singly while retaining the bale under compression by the others, feeding rollers for feeding the material in sheet form toward the bale, and movable guides operated by the plungers for guiding the material to the portions of the baling surface exposed by the withdrawal of the plungers.

23. In a baling press the combination, with means for supporting a bale, of two series of pivotally mounted bale forming and compressing plunger bars, the bars of each series having their combined areas substantially equal to that of the compressing face of the bale, means for forcing said plunger bars positively against the bale, and for raising the bars of one series successively and replacing the raised bars by bars of the other series, means for supplying the material in the form of a sheet and means for directing portions of the sheet upon the portions of the compressing surface of the bale as said portions are exposed by the raising of a plunger bar of either series.

24. In a baling press the combination, with means for supporting a bale, of two series of pivotally mounted bale forming and compressing plunger bars, the bars of each series having their combined areas substantially equal to that of the compressing face of the bale, means for forcing said plunger bars positively against the bale, and for raising the bars of one series successively and replacing the raised bars by bars of the other series, means for supplying the material in the form of a sheet and guides carried by said plunger bars for directing the material to the exposed portions of the compressing surface of the bale.

In testimony whereof I affix my signature, in the presence of two witnesses.

JAMES NELSON WOOD.

Witnesses:
AUGUSTUS W. BRADFORD,
JOHN B. McGRAW.

Copies of this patent may be obtained for five cents each, by addressing the "Commissioner of Patents, Washington, D. C."